United States Patent
Miyazaki et al.

(10) Patent No.: US 7,523,326 B2
(45) Date of Patent: Apr. 21, 2009

(54) METHOD AND APPARATUS FOR MAINTAINING A SUSPENSION STATE AFTER POWERING DOWN AND FULLY POWERING DOWN UPON EXPIRATION OF A TIMER OR LOW BATTERY LEVEL

(75) Inventors: Kiyoshi Miyazaki, Kawasaki (JP); Kinya Inoue, Kawasaki (JP); Hiromitu Nishimura, Kato-gun (JP); Masaru Tsurusaki, Yokohama (JP); Yoshio Nishinaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 11/026,087

(22) Filed: Jan. 3, 2005

(65) Prior Publication Data
US 2006/0068855 A1    Mar. 30, 2006

(30) Foreign Application Priority Data
Sep. 28, 2004    (JP)    .............................. 2004-282838

(51) Int. Cl.
*G06F 1/26*    (2006.01)
*G06F 1/32*    (2006.01)

(52) U.S. Cl. .................. 713/320; 713/300; 713/310; 713/323; 713/324; 713/330; 713/340; 455/574

(58) Field of Classification Search ................. 713/300, 713/310, 320, 323, 324, 330, 340; 455/574
See application file for complete search history.

(56) References Cited

U.S. PATENT DOCUMENTS

| | | | | |
|---|---|---|---|---|
| 5,018,148 A | * | 5/1991 | Patel et al. | ...................... 714/22 |
| 5,175,845 A | * | 12/1992 | Little | .......................... 713/323 |
| 5,442,794 A | * | 8/1995 | Wisor et al. | ................. 713/340 |
| 5,771,390 A | * | 6/1998 | Walker et al. | ............... 713/330 |
| 5,987,613 A | * | 11/1999 | Busch et al. | ................. 713/300 |
| 6,266,776 B1 | * | 7/2001 | Sakai | .......................... 713/300 |
| 6,378,068 B1 | * | 4/2002 | Foster et al. | .................... 713/1 |

(Continued)

FOREIGN PATENT DOCUMENTS

JP    5-88795    4/1993

(Continued)

OTHER PUBLICATIONS

Advanced Configuration and Power Interface Specification. Revision 2.0c, Aug. 25, 2003, pp. 3 and 55.*

(Continued)

*Primary Examiner*—Thomas Lee
*Assistant Examiner*—Jaweed A Abbaszadeh
(74) *Attorney, Agent, or Firm*—Kratz, Quintos & Hanson, LLP (57) ABSTRACT

It is an object of the present invention to shorten the time needed to start when a cellular phone is switched on. If a power key is switched off during operation, the display of an LCD is switched off, and key interrupts and the like are masked. In this case, data in the middle of the process of an application program in execution, execution addresses and the like are stored, and shift to a suspension state is signaled notified to a baseband unit. The CPU of an application unit is set to a deep sleep mode, and the cellular phone waits for a start instruction from the baseband unit.

10 Claims, 6 Drawing Sheets

U.S. PATENT DOCUMENTS

| | | | |
|---|---|---|---|
| 6,523,126 B1 * | 2/2003 | Brabenac | 713/323 |
| 6,571,343 B1 * | 5/2003 | Johnson et al. | 713/340 |
| 6,766,392 B2 * | 7/2004 | Furukawa et al. | 710/67 |
| 6,901,338 B2 * | 5/2005 | Ching | 702/63 |
| 7,024,321 B1 * | 4/2006 | Deninger et al. | 701/63 |
| 2001/0014950 A1 * | 8/2001 | Nishikawa | 713/300 |
| 2002/0073352 A1 * | 6/2002 | Okubo et al. | 713/600 |
| 2004/0098629 A1 * | 5/2004 | Khan | 713/300 |
| 2004/0187039 A1 * | 9/2004 | Yang | 713/300 |
| 2005/0022039 A1 * | 1/2005 | Inui et al. | 713/300 |

FOREIGN PATENT DOCUMENTS

| | | |
|---|---|---|
| JP | 7-56774 | 3/1995 |
| JP | 9-185436 | 7/1998 |
| JP | 10-240391 | 9/1998 |
| JP | 11-194846 | 7/1999 |
| JP | 11-327706 | 11/1999 |
| JP | 2001-103192 | 4/2001 |
| JP | 2001-222346 | 8/2001 |
| JP | 2002-163032 | 6/2002 |
| KR | 1999-3643 | 1/1999 |
| KR | 2001-38056 | 5/2001 |

OTHER PUBLICATIONS

Notice of Rejection Grounds for corresponding Korean Patent Application dated Jul. 31, 2006.

Chinese Patent Application dated Feb. 9, 2007 with English translation.

Notice of Rejection Grounds mailed Jul. 29, 2008, corresponding to Japanese Patent Application (2004- 282838). English-translation is enclosed.

Japanese Office Action mailed Feb. 3, 2009, including partial English-language translation.

* cited by examiner

METHOD AND APPARATUS FOR MAINTAINING A SUSPENSION STATE AFTER POWERING DOWN AND FULLY POWERING DOWN UPON EXPIRATION OF A TIMER OR LOW BATTERY LEVEL

BACKGROUND OF THE INVENTION

1. Field of the Invention

The present invention relates to the cellular phone and the operational mode switching method of a cellular phone.

2. Description of the Related Art

In a portable personal computer and the like, power consumption is reduced by switching the computer from a normal operational mode to a suspension mode and suspending the operation of a central processing unit (CPU) and devices while a user is not operating keys.

In the suspension mode, by storing in memory the operational information of the computer immediately before the power supply is switched off and continuing to supply the memory with power, the state immediately before the computer is switched to the suspension mode can be reproduced when power is switched on next time.

In computer equipment with such a suspension mode, a variety of technologies for reducing the power consumption of equipment are proposed.

For example, Patent Reference 1 discloses a technology for reducing wasteful power consumption by performing no suspension process in a portable personal computer provided with a main battery and a sub-battery if the main battery is disconnected.

Patent Reference 2 discloses a technology in which a user arbitrarily changes the switching order even if a plurality of power saving modes are set to be switched step by step by the operating system.

Patent Reference 3 discloses a technology for storing the contents of the main memory on a HDD or the like and switching the suspension mode to a hibernation mode if the built-in battery enters a low power state or the supply of external power is suspended when a computer system is in suspension mode.

With improvements of the function of cellular phones, the time needed to power up has increases as a high-performance operating system and multi-task application must be started, a variety of setting data must be read, and similarly when the power is switched on. Therefore, even when the power is switched on, a cellular phone cannot be used immediately, which is an inconvenience.

In order to solve the above-mentioned problem, it can be considered that a cellular phone is provided with a suspension mode. However, in the case of a cellular phone, since the remaining stored charge drops quickly, communication is made impossible. Therefore, the suspension function of a portable computer cannot be applied without any modifications.

Patent Reference 1: Japanese Patent Application No. Hei 9-185436

Patent Reference 2: Japanese Patent Application No. 2001-222346

Patent Reference 3: Japanese Patent Application No. Hei 11-194846

Patent Reference 4: Japanese Patent Application No. 2002-163032

SUMMARY OF THE INVENTION

It is an object of the present invention to shorten the time needed to start and not to impair the communication function of a cellular phone.

The cellular phone of the present invention comprises a power supply circuit which supplies each unit of a circuit with power obtained from a battery, a counter unit which counts the elapsed time of a suspension state and a mode switching unit which switches the cellular phone to a suspension state. In the suspension state power is supplied to some part of the circuits from the power supply circuit. If power is switched off during operation, the suspension state is entered. If the counter indicates that the suspension state has continued for a prescribed time or more, the state is switched to a power-off state in which the power supply to internal circuits is switched off.

According to the present invention, by switching the cellular phone to the suspension state when power is switched off, the time needed to start when power is switched on next time can be shortened. Furthermore, if the suspension state continues for a prescribed time or more, by switching the cellular phone to the power-off state, the battery consumption can be reduced to prevent the cellular phone from becoming unusable due to the small remaining charge of the battery.

The cellular phone of the present invention comprises a battery voltage detection unit which detects whether the battery voltage exceeds a prescribed value. If the battery voltage detected when power is switched off, which is detected by the battery voltage detection unit is less than the prescribed value, a mode switching unit switches the cellular phone to the power-off state in which power is not supplied to the internal circuits.

By such a configuration, if the battery voltage is less than the prescribed value, the discharging of the battery can be prevented by switching the cellular phone to the power-off state instead of the suspension state.

The cellular phone of the present invention also comprises a nullification unit which nullifies the operation of a monitor timer or detecting the abnormal operation of a CPU if the cellular phone is in the suspension state.

By such a configuration, abnormality is prevented from being detected by the monitor timer by mistake while the operation of the CPU is being suspended.

The cellular phone of the present invention also comprises a mask unit which masks a reset signal inputted by a CPU that executes an application program if the cellular phone is in the suspension state.

By such a configuration, if the power-on state returns from the suspension state, the CPU can be prevented from being reset and being started from the initial state.

The cellular phone of the present invention also comprises a determination unit which collates the status information of a CPU with the information of a storage circuit for storing information indicating whether the cellular phone is suspended and determining whether the cellular phone has returned from the suspension state when the cellular phone is switched on.

By such a configuration, it can be determined whether switching the power on is a return from the suspension state. Thus, if the state has returned from the suspension state, the process can be re-started from the suspended state.

The cellular phone of the present invention also comprises a power switch detection unit which detects whether a power switch is operated during normal operation. If the power switch detection unit detects that the power switch is operated during normal operation, the mode switching unit switches the operating state from the power-on state to the suspension state. If it is detected that the power switch is re-operated, the power-on state is returned from the suspension state.

By such a configuration, if the cellular phone is switched to the suspension state when power is switched on, and if power is re-switched, the time needed for the cellular phone to start can be shortened by switching the cellular phone on.

The cellular phone of the present invention also comprises a hardware watchdog timer which detects the abnormal operation of the CPU and a reset unit which resets the watchdog timer after a prescribed time if the cellular phone is suspended.

By such a configuration, the abnormal operation of the CPU can be prevented from being detected by the watchdog timer by mistake in the suspension state.

The cellular phone of the present invention also comprises a control unit which writes check data into memory if the operating state shifts to the suspension state, and determines the normality of the check data if the normal operating state returns from the suspension state. If the check data is normal, the control unit switches the normal operating state to the power-on state and re-starts the process, based on the data stored when the cellular phone is switched to the suspension state. If the check data is abnormal, the control unit resets the CPU and performs the process from the initial state.

By such a configuration, if there is an error in the check data, the occurrence of further errors can be avoided by resetting the CPU and performing the process from the initial state, instead of re-starting the process from the state immediately before the cellular phone is switched to the suspension state.

In the cellular phone of the present invention, if the check data is normal, the mode switching unit switches the cellular phone on and the control unit re-starts the process, based on the data stored when the cellular phone was switched to the suspension state. If the check data is abnormal, the mode switching unit switches the cellular phone on, and then the control unit resets the CPU and performs the process from the initial state.

DESCRIPTION OF THE PREFERRED EMBODIMENTS

Figure 1:
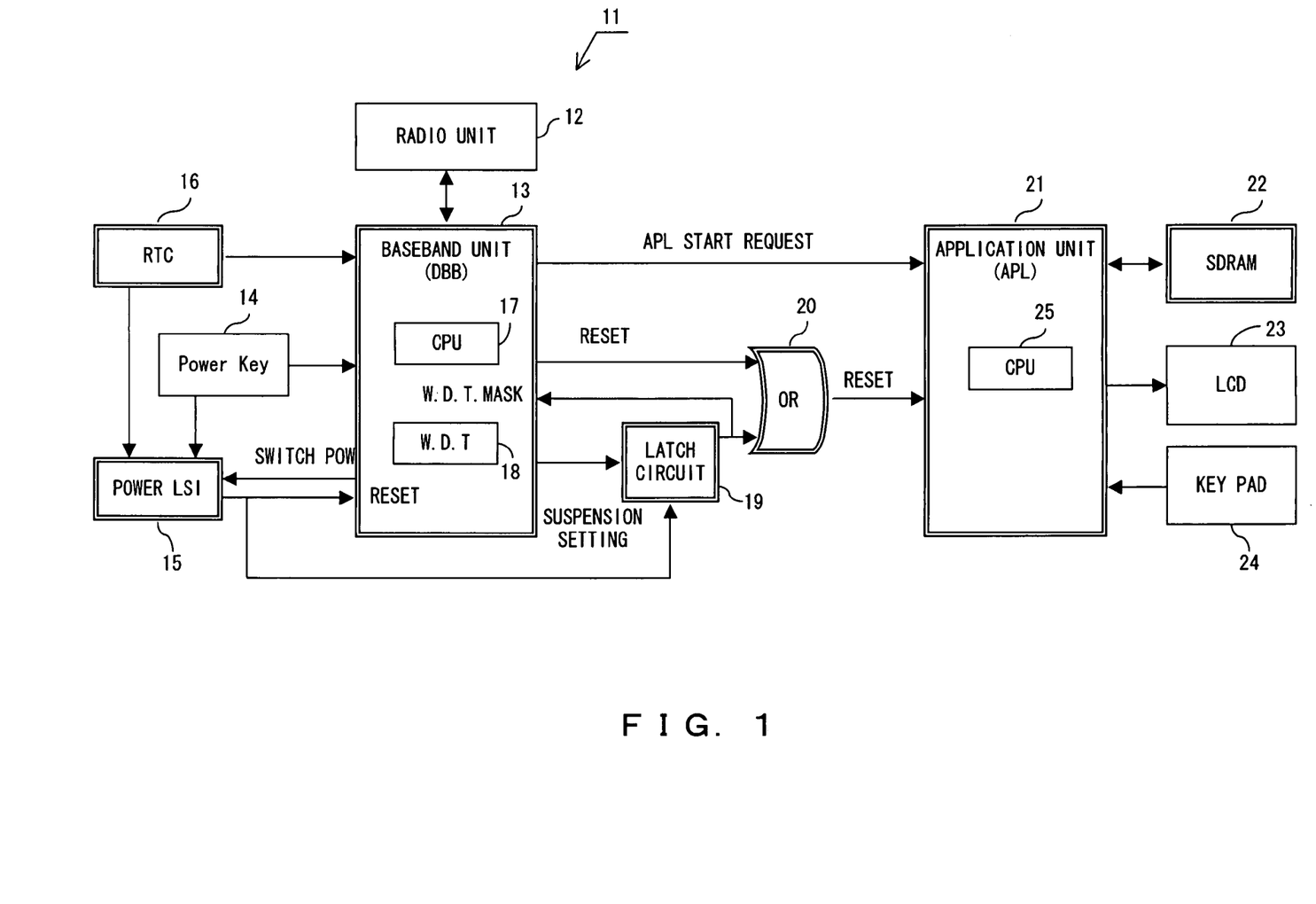
FIG. 1 is the circuit diagram of the cellular phone in the preferred embodiment.

The preferred embodiments of the present invention are described below with reference to the drawings. FIG. 1 is the circuit diagram of the cellular phone in the preferred embodiment.

A cellular phone 11 comprises a radio unit 12 for transmitting/receiving radio signals to/from a radio base station, a baseband unit 13 for converting signals received by the radio unit 12 into baseband signals and transmitting/receiving data to/from an application program, a power key 14 for switching power on/off, a power LSI 15 for controlling a power supply circuit for generating power voltage from a battery and supplying the power voltage to each unit of the circuit, and a real-time clock (RTC) 16.

The baseband unit 13 comprises a central processing unit (CPU) 17, a hardware watchdog timer (WDT) 18, a logic circuit, which is not shown in FIG. 1, and the like. When detecting that power is switched off after the power key 14 is being switched on for a specific time, the baseband unit 13 determines whether the cellular phone is set to make the suspension mode valid. If it is set to make the suspension mode valid, the baseband unit 13 performs a process of suspending the cellular phone, and also outputs a signal for instructing to suspend the cellular phone, to a latch circuit 19. The CPU 17 corresponds to, for example, the mode switching unit for switching the operational mode of the cellular phone, and the determination unit for determining whether the cellular phone has returned from the suspension state when returning to the power-on state. The CPU 17 also corresponds to the power switch detection unit for detecting whether the power switch is switched during normal operation, the nullification unit for nullifying the operation of the monitor timer, and the reset unit for resetting the watchdog timer at a specific time interval. Furthermore, the CPU 17 corresponds to the control unit for writing check data into memory when the cellular phone shifts from the operating state to the suspension state, and determining the normality of the written check data when the cellular phone returns to the normal operating state from the suspension state.

The latch circuit 19 (corresponding to the storage circuit) stores a signal, outputted from the baseband unit 13 to switch the cellular phone from the normal operating state to the suspension state, and outputs the signal both to an OR gate 20 and the baseband unit 13.

The cellular phone 11 further comprises an application unit 21 for executing application programs, a synchronous dynamic random-access memory (SDRAM) 22 for storing data obtained when the application programs are executed, a liquid crystal display (LCD) 23 for displaying a starting screen, an operation screen and the like, and a key pad 24 for inputting characters and numerals.

The application unit 21 comprises a CPU 25 for executing application programs and the like. The CPU 25 comprises a register for storing its own status information.

In this preferred embodiment, if the power key 14 of the cellular phone 11 is pushed for a specific time or more, the baseband unit 13 instructs the power LSI 15 to check whether the remaining charge of the battery exceeds a specific value. If the remaining charge of the battery exceeds a specific value, the baseband unit 13 performs a process of suspension. More specifically, the baseband unit 13 outputs a signal for requesting the suspension to the latch circuit 19, and also notifies the application unit 21 of the suspension.

If the remaining charge of the battery is less than the specific value when power is switched off, the cellular phone shifts to the power-off state instead of the suspension state.

If the power key 14 is operated after the battery is removed from the battery case unit, which is not shown in FIG. 1 and is reset during suspension, a reset signal is outputted from the power LSI 15, and both the latch circuit 19 and the baseband unit 13 are reset. As a result, the reset signal outputted from the baseband unit 13 is inputted to the application unit 21, and the CPU 25 of the application unit 21 starts from the initial state.

Figure 2:
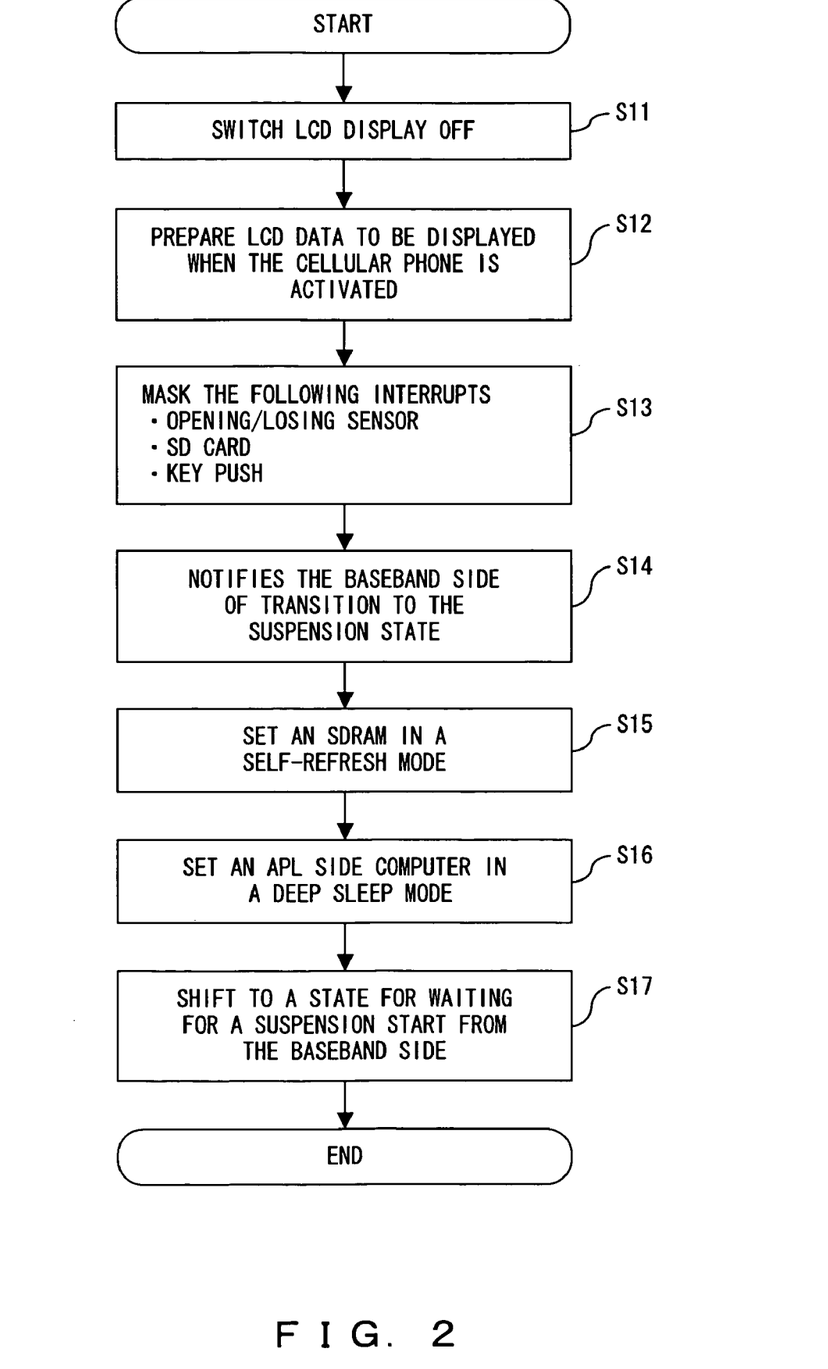
FIG. 2 is a flowchart on the application side in a case where the cellular phone shifts to the suspension state.

Here, the process of the application unit 21 in a case where the normal operating state is changed to the suspension state is described with reference to the flowchart shown in FIG. 2. The following process is performed by the CPU 25 of the application unit 21.

When notified of the suspension by the baseband unit 13, the following sequence of events occurs. The CPU 25 of the application unit 21 switches the display of the LCD 23 off (S11 in FIG. 2). The CPU 25 prepares data and the like to be displayed on the LCD 23 for next activation when the cellular phone is started (S12).

The interrupts generated by the opening/closing sensor for detecting the opening/closing of the case of the folding type cellular phone 11, the insertion of an SD card and a key operation are masked (S13). This is done so that the interrupt by the opening/closing of the case of the cellular phone, the insertion of the SD card, key operation and the like cannot be received in the suspension state.

The suspension of the application side is communicated to the baseband side (S14), the SDRAM 22 is set to a self-refresh mode (S15).

Data in the middle of the process of an application program, execution addresses and the like are stored in a register or memory, and the CPU 25 on the application (APL) side is set to a deep sleep mode (S16). In the deep sleep mode, power supply to the peripheral circuits of the CPU 25 is stopped and the power consumption of the entire circuit including the CPU 25 is reduced to its lowest level.

The CPU 25 on the application mode shifts to a state for waiting for activation by the CPU 17 on the baseband side (S17).

Next, the process of the baseband unit 13 in a case where the cellular phone shifts from the normal operating state to the suspension state is described with reference to the flowcharts shown in FIGS. 3A and 3B. The following process is performed by the CPU 17 of the baseband unit 13.

Figure 3A:
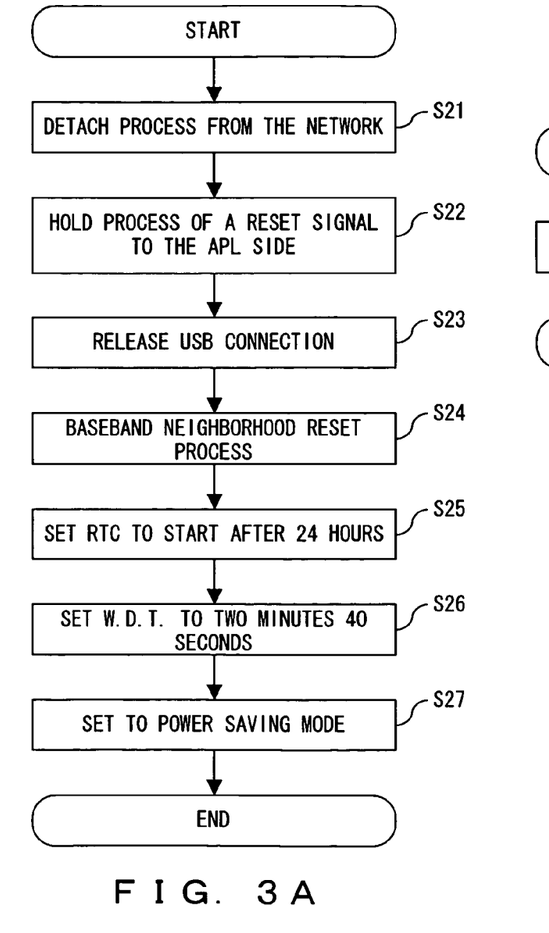
FIGS. 3A and 3B are the flowcharts of a baseband unit in a case where the cellular phone shifts to the suspension state.

Firstly, a detachment process of notifying the radio base station of the power switch-off of the cellular phone 11 is performed (S21 in FIG. 3A).

Then, a holding process of masking a reset signal outputted to the application unit 21 from the baseband unit 13 is performed (S22).

This is because when the cellular phone 11 returns to the power-on state from the suspension state, a reset signal is outputted to the application unit 21 from the baseband unit 13 and the process of the application unit 21 must be prevented from starting from the initial state.

Then, the USB connection is released (S23), and peripheral circuits of the base band unit 13 are reset (S24)

Then, 24 hours are set in the real-time clock 16 as the upper limit of a count value (S25). The real-time clock 16 counts an elapsing time after the cellular phone 11 is switched to the suspension state, and when the counted time reaches the upper limit value of 24 hours, the real-time clock 16 outputs a signal notifying the baseband unit 13, that 24 hours has elapsed.

Then, two minutes 40 seconds are set as the upper limit of the count value of the watchdog timer (WDT) 18 (S26). The upper limit value to be set in the watchdog timer 18 when the cellular phone is switched to the suspension state is set to be larger than the upper limit value during normal operation. This is because the CPU 17 is set in the deep sleep mode in the suspension state, and the watchdog timer 18 is reset by activating the CPU 17 after a specific time interval using a signal of 32 kHz supplied to the baseband unit 13 from the real-time counter 16 as a reference clock. Thus, the operation of the watchdog timer 18 can be nullified.

Alternatively, by providing a hardware timer circuit, instead of the CPU 17, the timer circuit can reset the watchdog timer 18. The operation of the watchdog timer 18 can also be suspended by the suspension mode.

Then, both the baseband unit 13 and its peripheral circuits can be set in a power saving mode, that is, the suspension state (S27). In the suspension mode, power is supplied only to circuits enclosed by a double line, of the circuits shown in FIG. 1, and is not supplied to the other circuits.

Figure 3B:
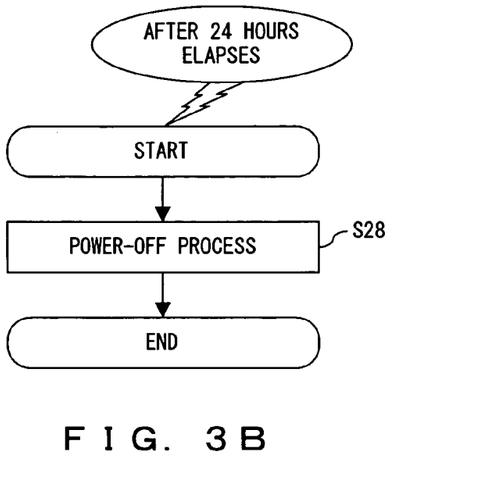

If the real-time clock 16 counts that 24 hours has elapsed after the cellular phone is switched to the suspension state, a power-off process in step S28 of FIG. 3B is performed and the suspension state is switched to the power-off state. In this power-off process, power supply to the entire circuit is suspended by suspending power supply to circuit blocks enclosed by a double line shown in FIG. 1, to which power is supplied in a standby state.

Figure 4:
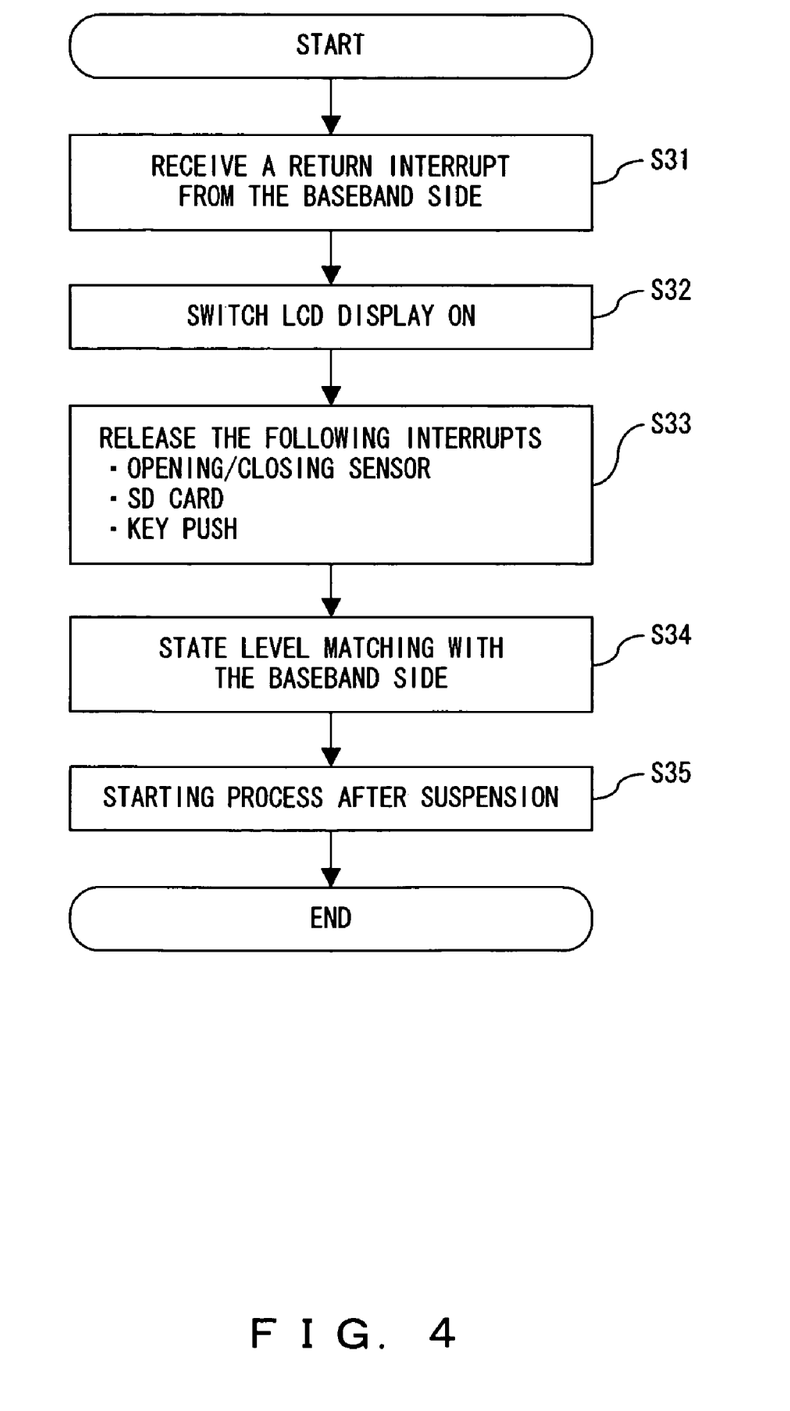
FIG. 4 is a flowchart of the application side in a case where the cellular phone returns from the suspension state.

Next, the process of the application unit 21 in a case where a user switches the power key 14 on and the cellular phone returns to the power-on state from the suspension state is described with reference to the flowchart shown in FIG. 4. The following process is performed by the CPU 25 of the application unit 21.

If the CPU 17 of the baseband unit 13 detects that the power key 14 is switched on, the baseband unit 13 outputs an interrupt signal for switching the cellular phone on to the application unit 21.

Upon receipt of a return interrupt from the baseband unit 13 (S31 in FIG. 4), the application unit 21 switches the display of the LCD 23 on (S32). In the LCD 23, display data at the time of activation in a case where the cellular phone is switched to the suspension state is prepared. Therefore, if the cellular phone is re-switched on, the prepared display data is displayed.

Then, the mask of interrupt by the opening/closing of a case, the insertion of an SD card and a key operation is released (S33). Then, the matching of a state level with the baseband side is performed (S34). In this level matching process, the status information of the CPU 25 is matched with the status information at the time of normal start.

Then, a starting process after suspension is performed (S35). In this starting process, the process is re-started based on information, such as data in the middle of the execution of an application program, an execution address and the like, stored in a suspension state. Furthermore, the process is re-started based on information, such as data in the middle of the process of an application program stored in a register or the like.

Next, the process of the baseband unit 13 in a case where the cellular phone returns to the power-on state from the suspension state is described with reference to the flowchart shown in FIG. 5. The following process is performed by the CPU 17 of the baseband unit 13.

Figure 5:
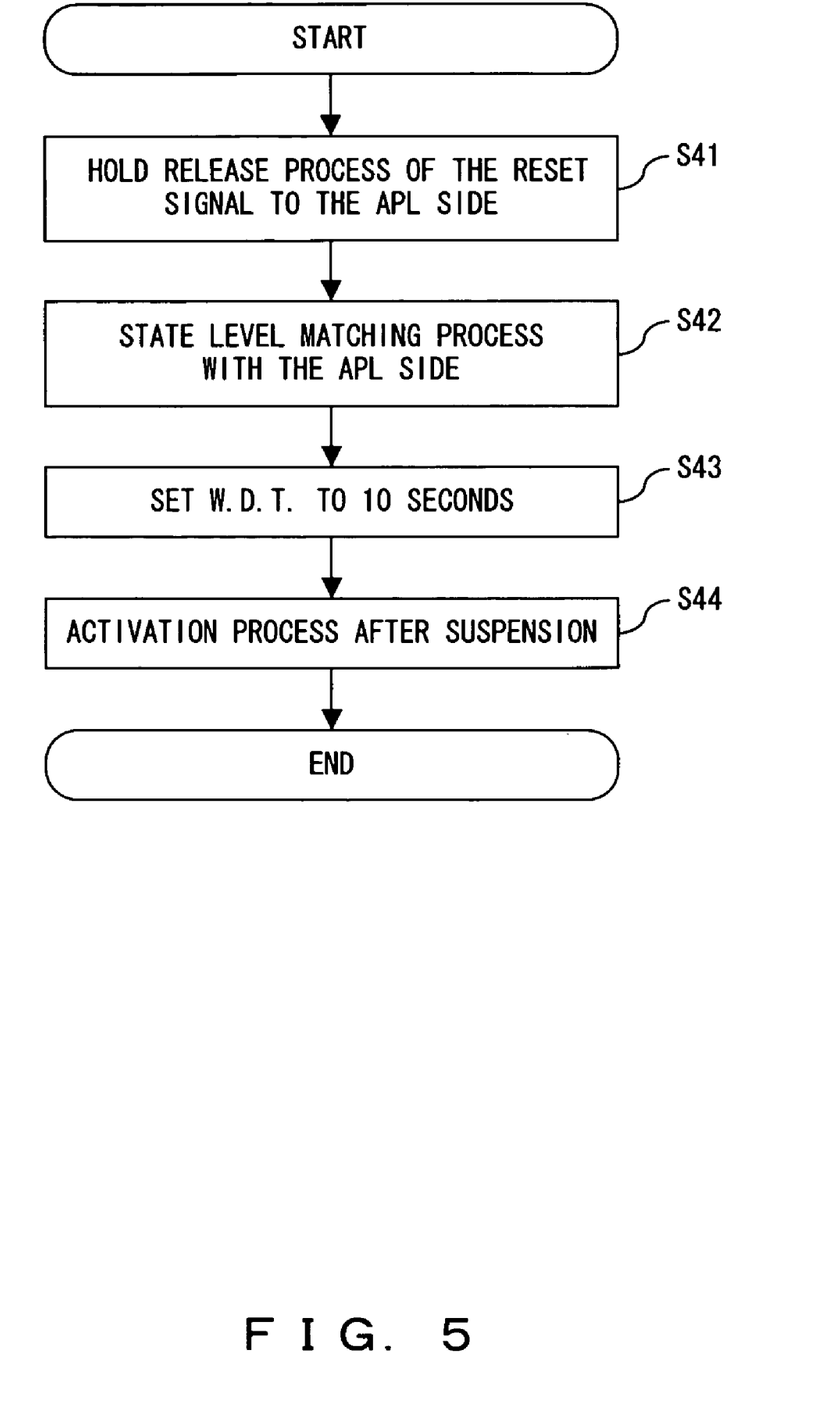
FIG. 5 is the flowchart of the baseband unit in a case where the cellular phone returns from the suspension state.

Firstly, the holding of a reset signal to the application side is released (S41 in FIG. 5). In this process, a signal for releasing the suspension state is outputted from the baseband unit 13 to the latch circuit 19, and the level of the latch circuit is reduced to a low level.

Then, the matching of a state level with the application unit 13 is performed (S42). In this level matching process, the status information of the CPU 17 is matched with the status information of the application unit 21 at the time of normal start.

Then, the upper limit value of the watchdog timer 18, used to detect the abnormal operation of the CPU 17, is set to ten seconds (S43). This is because the upper limit value of the watchdog timer 18, used to detect the abnormal operation must be set to a short time since the CPU 17 is operated by a clock signal with a high frequency in normal operation.

Then, a starting process after suspension is performed (S44). In this starting process, power is supplied to the radio unit 21 and the peripheral circuits of the baseband unit 13 in which power is switched off in the suspension state, such as communication circuits and the like. Furthermore, the process is re-started based on information, such as data in the middle of the process, execution addresses and the like, stored in the register of the CPU 17 and the like.

In the starting process after suspension on the application or baseband side, the following process can also be performed.

If the cellular phone shifts from the operating state to the suspension state, check data can be written into volatile or non-volatile memory in advance, and if the cellular phone returns to the power-on state from the suspension state, whether the process should be re-started or performed from the initial state can also be determined by checking the normality of the check data stored in the memory.

In other words, if the check data is normal, the process is re-started based on data stored when the cellular phone is switched to the suspension state. If the check data is abnormal, the CPU is reset and the process is started from the initial state.

Thus, only when there is no error during suspension, the process can be re-started from the state in which the cellular phone is switched to the suspension state. Therefore, the abnormal process of the CPUs 17 and 25 due to an error caused during suspension can be prevented.

Figure 6:
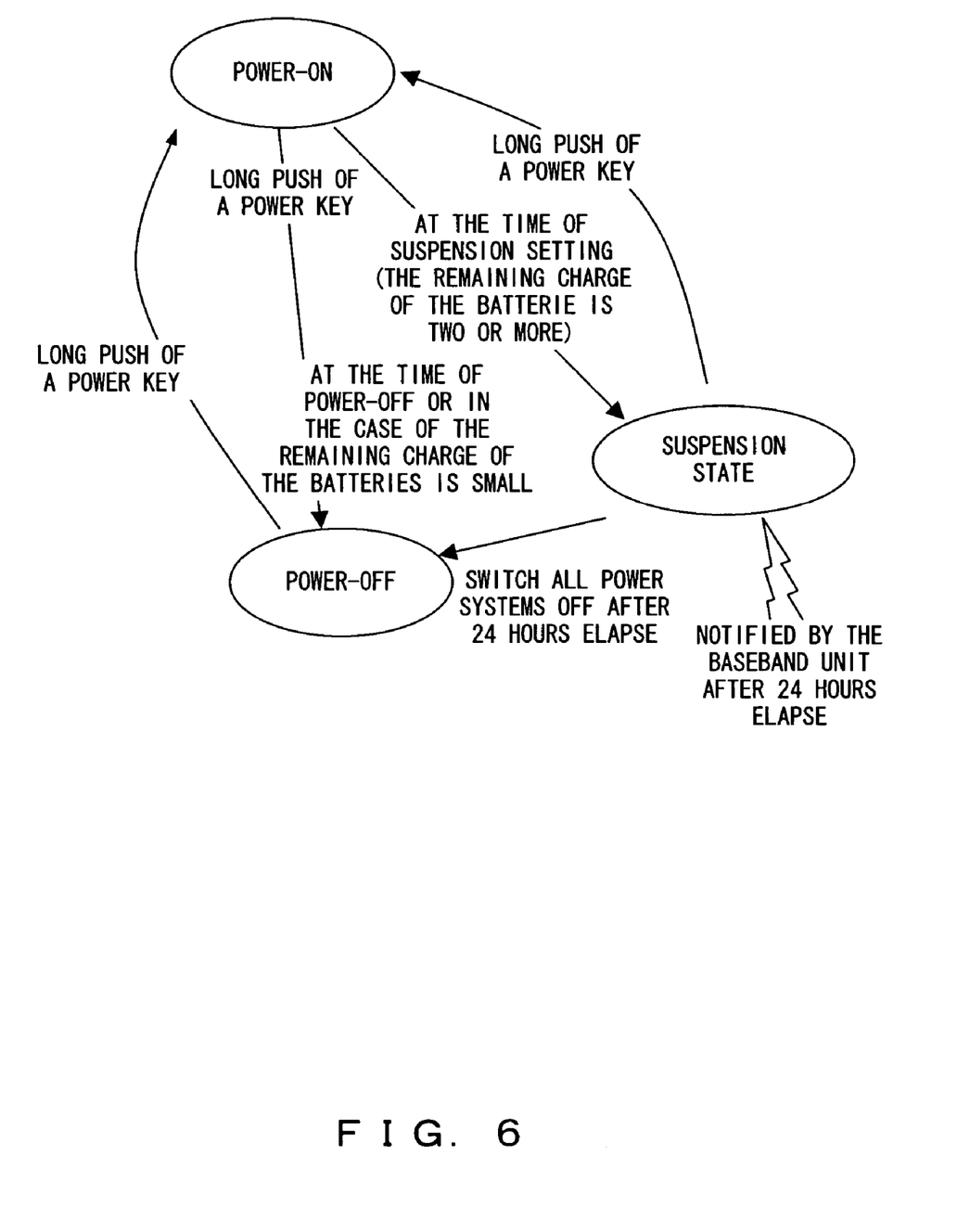
FIG. 6 is the state transition diagram of the cellular phone in the preferred embodiment.

Here, the transition of an operating state in a case where a user pushes the power key 14 for a long time is described with reference to the state transition diagram shown in FIG. 6.

If the power key 14 is pushed for a prescribed time or more in the normal operation in which power is supplied to all the circuits, firstly, it is determined whether the remaining charge of the battery exceeds a prescribed value. If the remaining charge of the battery is less than the prescribed value, the cellular phone is switched off.

If the remaining charge of the battery exceeds the prescribed value, the cellular phone is switched to the suspension state. If in the suspension state, a time counted by the real-time clock 16 exceeds a prescribed time, for example, 24 hours or more, an instruction to switch power off is notified to the power LSI 15 from the baseband unit 13. Upon receipt of this instruction, the power LSI 15 switches all the circuits off.

If the power key 14 is pushed for a prolonged period in the suspension state or the power-off state, the cellular phone shifts to the power-on state in which power is supplied to all the circuits.

According to the above-mentioned preferred embodiment, if the power key 14 is pushed for a specific time or more, the power-on state is switched to the suspension state. By returning the suspension state to the power-on state when the power key 14 is switched on, the cellular phone 11 can be activated in a short time. Even when the cellular phone is switched to the suspension state, the cellular phone 11 switched off after a specific time or more elapses. Therefore, by supplying power to some of the circuits in the suspension state, the battery can be prevented from becoming discharged and, as a result, the cellular phone 11 can be prevented from becoming unusable.

As described above, it is especially necessary for equipment whose battery capacity is fairly small and which must be always communicable, like the cellular phone 11, to secure the remaining charge of the battery by switching the cellular phone 11 off after a specific time elapses in the suspension state.

Since when the cellular phone is switched to the suspension state, the display of the LCD 23 is blank, and key input and the like becomes invalid, it looks to a user as if the cellular phone were switched off. If the power key 14 is operated, a starting screen is displayed on the LCD 23 and immediately the process is started. Therefore, the user perceives a reduced amount of time to start.

Furthermore, when power is switched off, it is determined whether the remaining charge of the battery exceeds a prescribed value. If the remaining charge of the battery is less than the prescribed value, the cellular phone is switched off instead of being switched to the suspension state. Therefore, even if the cellular phone is suspended when the remaining charge of the battery is low, the remaining charge of the battery can be prevented from further decreasing.

Alternatively, when the power-on state returns from the suspension state, status information stored in the register of the CPU 17 can be compared with information stored in a hardware circuit, such as the latch circuit 19. Only if the information of both agrees or meets certain conditions, can the process re-start based on the status information stored in the CPUs 17 and 25.

Thus, errors can be prevented from occurring due to an error generated during suspension when the suspension is released.

The present invention is not limited to the above-mentioned preferred embodiments and can also be configured as follows.

Although in the above-mentioned preferred embodiments, information for instructing to switch the suspension state is stored in the latch circuit 19, the information can also be stored in another hardware circuit.

The circuit for masking a reset signal is not limited to the OR gate 20, and can also be another logic circuit.

The timer for counting the elapsing time of the suspension state is not limited to the real-time clock 16 outside the baseband unit 13, but can also be stored inside the baseband unit 13.

Furthermore, although in the above-mentioned preferred embodiment, the cellular phone is switched to the suspension state by operating the power switch during operation, the cellular phone can also be suspended by operating a dedicated or special key for suspending the cellular phone.

In the above-mentioned preferred embodiments, power is supplied to the baseband unit 13 in the suspension state. However, power supply to the baseband unit 13 can also be suspended, and if the power key 14 is operated, for example, the real-time clock 16 can also instruct to start power supply to the baseband unit 13.

According to the present invention, when power is switched off, the time needed to start when power is switched on next time can be reduced. Furthermore, if a prescribed time or more elapses in the suspension state, the consumption of the battery can be reduced by switching the suspension state to the power-off state.

What is claimed is:

1. A cellular phone, comprising:
    a power supply circuit which supplies each unit of a circuit with power obtained from a battery;
    a counter unit which counts the elapsing time of a suspension state;
    a mode switching unit which switches the cellular phone from a normal operating state to the suspension state in which power is supplied to only a part of the circuit from the power supply circuit and nullifies the operation of a monitor timer for detecting the abnormal operation of a CPU if power is switched off during operation, and release the suspension state and switches the state to a power-off state in which the power supply to internal circuits is stopped if the counter counts that the suspension state has continued for a prescribed time or more; and a battery voltage detection unit which detects whether battery voltage exceeds a prescribed value, wherein if the battery voltage detected by said battery voltage detection unit when power is switched off is less than the prescribed value, said mode switching unit switches the cellular phone to the power-off state in which power is not supplied to the internal circuits.

2. The cellular phone according to claim 1, further comprising a mask unit which masks a reset signal inputted to the CPU for executing an application program if the cellular phone is switched to the suspension state.

3. The cellular phone according to claim 1, further comprising a determination unit which determines whether the cellular phone is returning from the suspension state by collating the status information of a CPU with the information of a storage circuit for storing information, to determine whether the cellular phone has been set to the suspension state, when the cellular phone is switched on.

4. The cellular phone according to claim 1, further comprising a power switch detection unit which detects whether the power switch has been operated during normal operation, wherein if said power switch detection unit detects that the power switch has been operated during normal operation, said mode switching unit switches the operating state from a power-on state to the suspension state, and if it is detected that the power switch has been re-operated, said mode switching unit switches the cellular phone on.

5. The cellular phone according to claim 1, further comprising a hardware watchdog timer which detects the abnormal operation of a CPU; and a reset unit which resets the watchdog timer at a prescribed time interval if the cellular phone is switched to the suspension state.

6. The cellular phone according to claim 1, further comprising a control unit which writes check data into memory if the cellular phone shifts to a suspension state from an operating state, determines the normality of the check data if the cellular phone returns to the normal operating state from the suspension state, re-starts normal operating process based on data stored when the cellular phone has been switched to the suspension state if the check data is normal, and resets a CPU and performing the normal operating process from an initial state if the check data is abnormal.

7. The cellular phone according to claim 6, wherein if the check data is normal, said mode switching unit switches the cellular phone on and then said control unit re-starts the normal operating process based on data stored when the cellular phone has been switched to the suspension state, and if the check data is abnormal, said mode switching unit switches power on, and said control unit resets the CPU and performs the normal operating process from the initial state.

8. An operational mode management method of a cellular phone, comprising:

counting the elapsing time of a suspension state;

controlling a power supply circuit of a battery and switching the cellular phone to the suspension state in which power voltage is supplied to only a part of the circuit and the operation of a monitor timer for detecting the abnormal operation of a CPU is nullified if power is switched off during operation, and releasing the suspension state and switching the cellular phone to a power-off state in which the power supply to internal circuits is stopped if the counter counts that the suspension state has continued for a prescribed time or more;

detecting whether battery voltage exceeds a prescribed value using a battery voltage detection unit, and switching the cellular phone to a power-off state in which no power is supplied to internal circuits if the battery voltage detected when the power switch has been operated is less than the prescribed value when switching the operating state.

9. The operational mode management method of a cellular phone according to claim 8, further comprising writing check data into memory if the cellular phone shifts to a suspension state from an operating state, determining the normality of the check data if the cellular phone returns to a normal operating state from the suspension state, re-starting the process based on data stored when the cellular phone has been switched to the suspension state if the check data is normal, and resetting a CPU and performing a normal operating process from an initial state if the check data is abnormal.

10. A cellular phone, comprising:

a power supply circuit for supplying each unit of a circuit with power obtained from a battery;

counter means for counting the elapsing time of a suspension state;

mode switching means for switching the cellular phone to the suspension state in which power voltage is supplied to only apart of the circuit from the power supply circuit and nullifies the operation of a monitor timer for detecting the abnormal operation of a CPU if power is switched off during operation, and releasing the suspension state and switching the state to a power-off state in which the power supply to internal circuits is turned off if the counter counts that the suspension state has continued for a prescribed time or more; and a battery voltage detection unit which detects whether battery voltage exceeds a prescribed value, wherein if the battery voltage detected by said battery voltage detection unit when power is switched off is less than the prescribed value, said mode switching unit switches the cellular phone to the power-off state in which power is not supplied to the internal circuits.

* * * * *